US012562992B2

(12) United States Patent
Rodriguez Natal et al.

(10) Patent No.: US 12,562,992 B2
(45) Date of Patent: Feb. 24, 2026

(54) PROXY STATE SIGNALING FOR NETWORK OPTIMIZATIONS

(71) Applicant: Cisco Technology, Inc., San Jose, CA (US)

(72) Inventors: Alberto Rodriguez Natal, Leon (ES); John A. Joyce, Nashua, NH (US); Saswat Praharaj, Pleasanton, CA (US); Timothy James Swanson, Westford, MA (US); Lorand Jakab, Gheorghieni (RO); Fabio R. Maino, Palo Alto, CA (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 18/201,998

(22) Filed: May 25, 2023

(65) Prior Publication Data

US 2024/0214319 A1 Jun. 27, 2024

Related U.S. Application Data

(60) Provisional application No. 63/435,418, filed on Dec. 27, 2022.

(51) Int. Cl.
| | |
|---|---|
| *G06F 15/173* | (2006.01) |
| *H04L 47/2475* | (2022.01) |
| *H04L 67/564* | (2022.01) |

(52) U.S. Cl.
CPC ........ *H04L 47/2475* (2013.01); *H04L 67/564* (2022.05)

(58) Field of Classification Search
CPC ........................... H04L 47/2475; H04L 67/564

USPC ......................................................... 709/238
See application file for complete search history.

(56) References Cited

U.S. PATENT DOCUMENTS

| | | | |
|---|---|---|---|
| 9,141,625 B1 | 9/2015 | Thornewell et al. | |
| 2011/0238825 A1 | 9/2011 | Maffione et al. | |
| 2013/0091273 A1 | 4/2013 | Ly et al. | |
| 2018/0219744 A1* | 8/2018 | Rajagopal ........... | H04L 41/0895 |
| 2018/0270170 A1* | 9/2018 | Shetti .................. | H04L 49/9005 |

(Continued)

OTHER PUBLICATIONS

Rückert, J., Bifulco, R., Rizwan-Ul-Haq, M., Kolbe, H. J., & Hausheer, D. (May 2014). Flexible traffic management in broadband access networks using software defined networking. In 2014 IEEE Network Operations and Management Symposium (NOMS) (pp. 1-8). IEEE.

*Primary Examiner* — Alan S Chou
(74) *Attorney, Agent, or Firm* — Lee & Hayes, P.C.

(57) ABSTRACT

Techniques for signaling, to a network controller, a connection state of a proxy for use by the network controller to correlate proxied-connections with application pairs for traffic optimization. In some examples, the techniques may include receiving, at a controller of a network, control plane information associated with a proxy that manages a proxied flow through the network. Based on the control plane information, the controller may determine that application traffic is flowing across the proxied flow between a first application and a second application. In this way, based at least in part on a policy associated with at least one of the first application or the second application, the controller may reconfigure a network element of the network for optimizing the application traffic flowing across the proxied flow.

20 Claims, 10 Drawing Sheets

(56)     References Cited

U.S. PATENT DOCUMENTS

| | | | |
|---|---|---|---|
| 2019/0098687 A1 | 3/2019 | Backholm et al. | |
| 2022/0263758 A1* | 8/2022 | Zhang | H04L 45/50 |
| 2024/0259857 A1* | 8/2024 | Zhu | H04W 28/0263 |
| 2024/0275802 A1* | 8/2024 | Azvine | H04L 63/20 |
| 2024/0430347 A1* | 12/2024 | Ihlar | H04L 12/1407 |

* cited by examiner

500

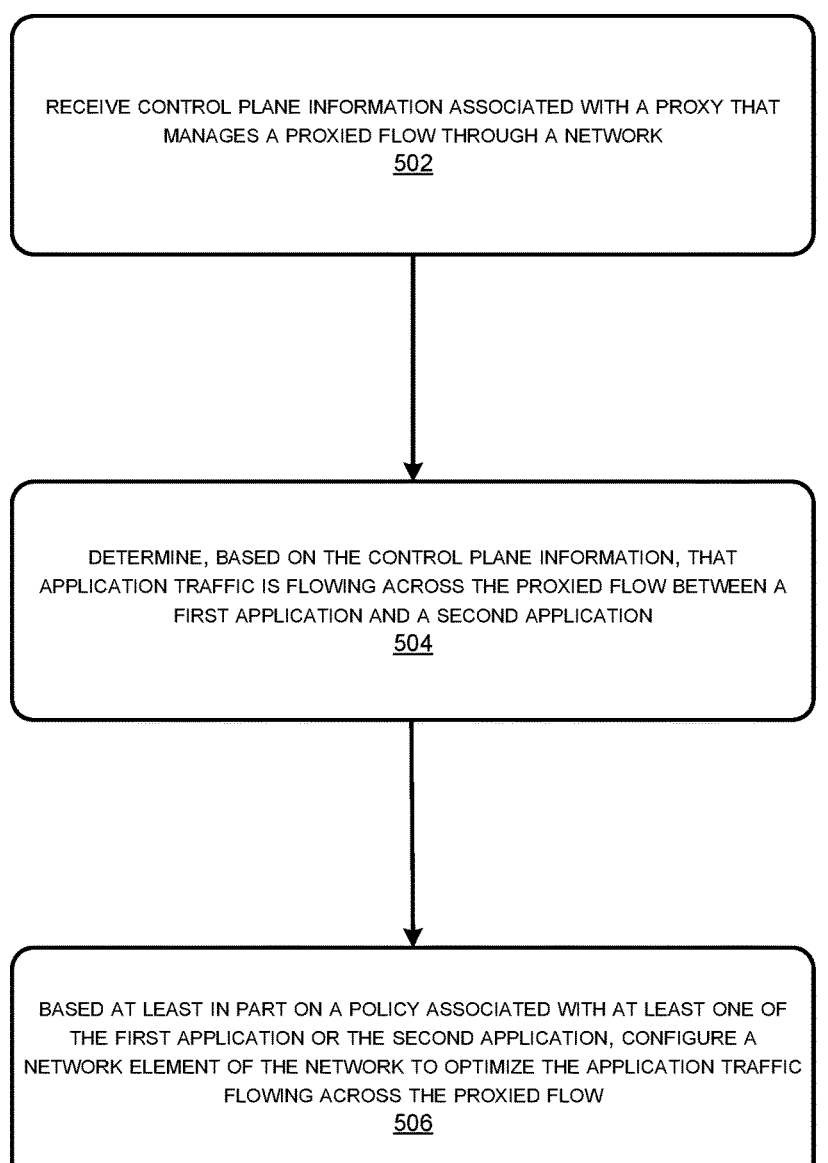

RECEIVE CONTROL PLANE INFORMATION ASSOCIATED WITH A PROXY THAT
MANAGES A PROXIED FLOW THROUGH A NETWORK
502

DETERMINE, BASED ON THE CONTROL PLANE INFORMATION, THAT
APPLICATION TRAFFIC IS FLOWING ACROSS THE PROXIED FLOW BETWEEN A
FIRST APPLICATION AND A SECOND APPLICATION
504

BASED AT LEAST IN PART ON A POLICY ASSOCIATED WITH AT LEAST ONE OF
THE FIRST APPLICATION OR THE SECOND APPLICATION, CONFIGURE A
NETWORK ELEMENT OF THE NETWORK TO OPTIMIZE THE APPLICATION TRAFFIC
FLOWING ACROSS THE PROXIED FLOW
506

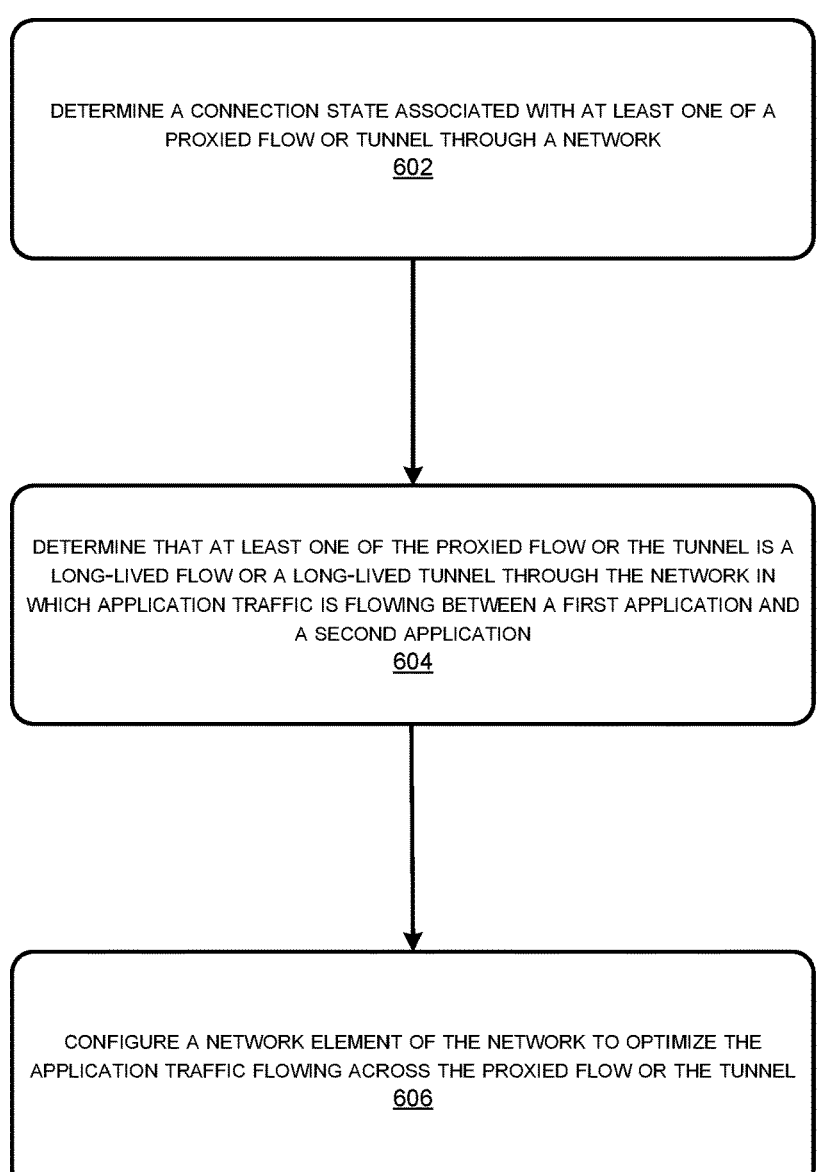

DETERMINE A CONNECTION STATE ASSOCIATED WITH AT LEAST ONE OF A
PROXIED FLOW OR TUNNEL THROUGH A NETWORK
602

DETERMINE THAT AT LEAST ONE OF THE PROXIED FLOW OR THE TUNNEL IS A
LONG-LIVED FLOW OR A LONG-LIVED TUNNEL THROUGH THE NETWORK IN
WHICH APPLICATION TRAFFIC IS FLOWING BETWEEN A FIRST APPLICATION AND
A SECOND APPLICATION
604

CONFIGURE A NETWORK ELEMENT OF THE NETWORK TO OPTIMIZE THE
APPLICATION TRAFFIC FLOWING ACROSS THE PROXIED FLOW OR THE TUNNEL
606

FIG. 6

PROXY STATE SIGNALING FOR NETWORK OPTIMIZATIONS

CROSS-REFERENCE TO RELATED APPLICATION

This patent application claims priority to U.S. Provisional Patent Application No. 63/435,418, filed Dec. 27, 2022, which is fully incorporated herein by reference.

TECHNICAL FIELD

The present disclosure relates generally to techniques for, among other things, signaling a connection state of a proxy to a network controller for use in correlating proxied-flows with application pairs for traffic optimization.

BACKGROUND

Proxies are prevalent on modern application networking. Technologies like application programming interface (API) gateways, layer-7 load balancers, service meshes, and others have made proxies the standard for handling application traffic. While proxies have full visibility of the traffic they handle, network elements in between the proxies lack insight regarding the traffic that travels from proxy to proxy. One of the main reasons is that traffic is typically encrypted between the proxies. In order to distinguish traffic between different applications that are being served by a set of proxies, the underlaying network elements need extra help.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 is a flow diagram illustrating an example method associated with the techniques described herein.

FIG. 6 is a flow diagram illustrating another example method associated with the techniques described herein.

DESCRIPTION OF EXAMPLE EMBODIMENTS

Overview

Figure 1:
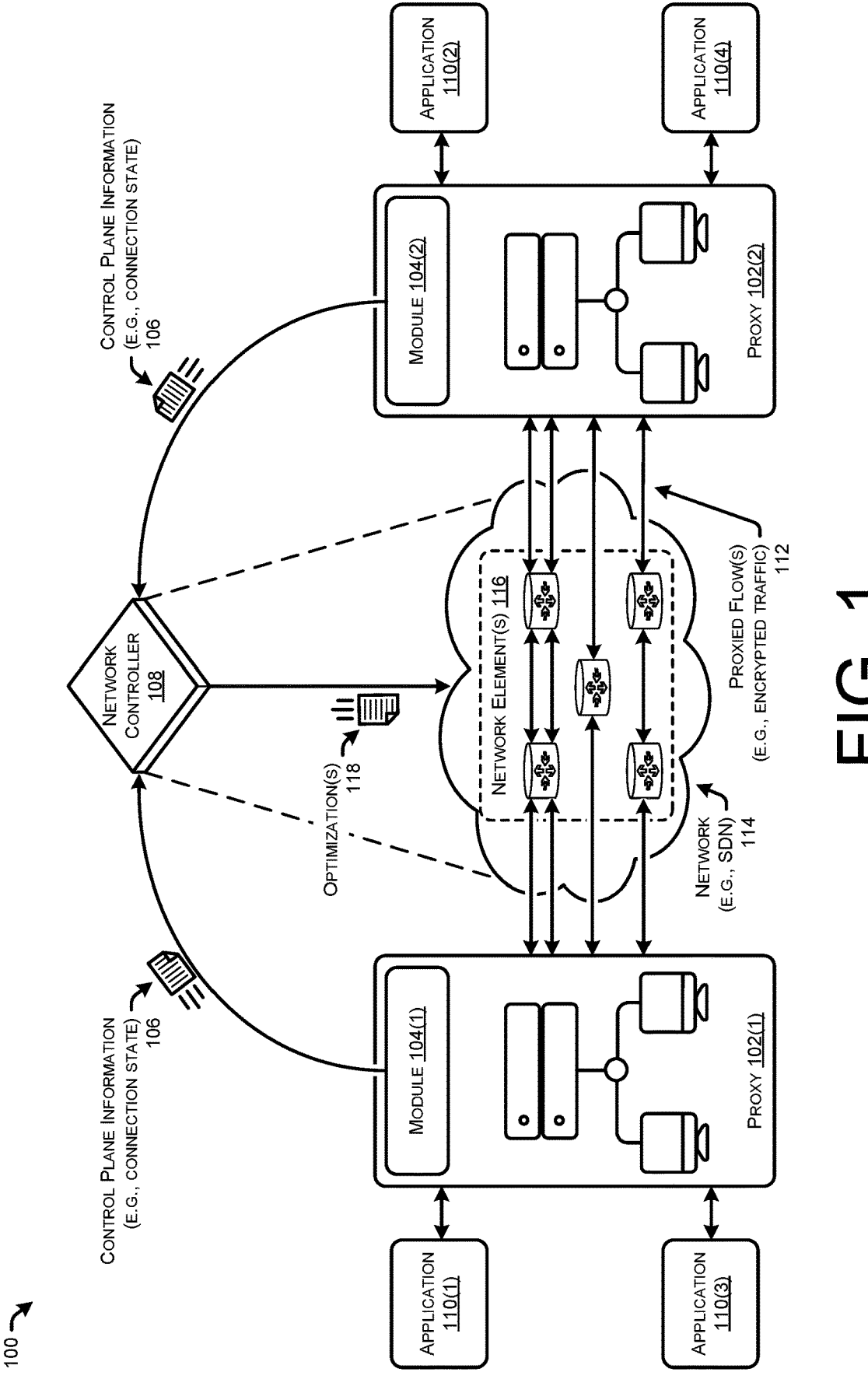
FIG. 1 illustrates an example architecture in which various aspects of the techniques disclosed herein may be performed. The exemplary proxies shown in FIG. 1 include a module that is configured to forward control plane information to the controller.

This disclosure describes various technologies for, among other things, signaling a connection state of a proxy to a network controller for use in correlating proxied-flows with application pairs for traffic optimization. By way of example, and not limitation, the techniques described herein may include receiving, at a controller of a network, control plane information associated with a proxy that manages a proxied flow through the network. Based on the control plane information, the network controller may determine that application traffic is flowing across the proxied flow between a first application and a second application. Additionally, based at least in part on a policy associated with at least one of the first application or the second application, the network controller may configure a network element of the network to optimize the application traffic flowing across the proxied flow.

Additionally, the techniques described herein may be performed as a method and/or by a system having non-transitory computer-readable media storing computer-executable instructions that, when executed by one or more processors, performs the techniques described above and herein.

Example Embodiments

As noted above, proxies are prevalent on modern application networking. While proxies have full visibility of the traffic they handle, network elements in between the proxies lack insight regarding the traffic that travels between the proxies. Because traffic belonging to different applications is hard to distinguish when the applications are behind proxies, the ability of the network elements in between the proxies is limited with respect to optimizing the traffic flowing across the applications and applying per-application specific policies. One of the main reasons for this is that traffic is typically encrypted between the proxies. Thus, in order to distinguish traffic between different applications that are being served by a set of proxies, the underlaying network elements need extra help. It is possible, for instance, for the proxies to include some metadata or special signaling along with the traffic they send to help in-between network elements identify the traffic. However, this typically requires modifying the proxies, which comes with its own set of trade-offs.

This application describes technologies for solving the above noted problems by leveraging control-plane access to the proxies to extract, in real time, information regarding which connections are established. Particularly, when the proxied connections are long-lived (e.g., file transfers), or in proxy architectures where applications communicate over long-lived tunnels (e.g., Istio Ambient Mesh), the technologies disclosed herein provide the ability to extract and leverage connection state(s) from the proxies and use it to render optimizations on the interconnection network without requiring modifying the proxies. According to the technologies disclosed herein, in some examples, off-band signaling may be used to allow in-between network elements to correlate different proxy flows (e.g., flows established between the proxies) with different application flows (e.g., flows established between applications) being served by the proxies.

For example, traditional proxy architectures establish proxied connections on demand as applications create connections with one another, as well as tear down the proxied connections when the application connection is done. While the proxied connection is ongoing, the proxy has knowledge (e.g., state) of which proxied connections correspond to which application connections. Having access to this proxy state allows external entities between the proxies to correlate the traffic observed between the proxies with application pair traffic.

Another proxy architecture that is gaining traction is using application level tunnels between proxies that are maintained over a period of time to serve traffic between the same application pair. For example, this is the case for HBONE (HTTP Based Overlay Network Enviroment) tunnels established between zTunnel proxies in the Istio Ambient Mesh solution. The goal is to amortize costly TLS (Transport Layer Security) handshakes by maintaining long-lived tunnels, which departs from traditional proxy solutions that just proxy connections as they appear and do not reuse connections.

In examples, the technologies disclosed herein exploit the nature of these and other common proxy architectures to get the state of long-lived connections between the proxies, the state of the HBONE tunnels that are long-lived by nature, or the like. This state may then be used, in some examples, to identify application flows and render optimizations on the network in-between proxies. In some examples, the technologies disclosed herein may leverage modern network architecture, such as a Software-Defined Network (SDN), to deliver network optimizations. For example, in the case of an SDN, interaction with the underlaying network can happen in a centralized manner through a network controller. In several examples, this network controller is the entity that needs to be aware of the state at the proxies in order to render optimizations.

The techniques of this disclosure for providing proxy connection state to a network controller can be accomplished in a number of ways. For example, in some instances the proxies may be extended by the use of a module. If the proxies are Envoy proxies, for instance, this module can be an Envoy Filter, a Lua module, and/or a Web Assembly (WASM) module, for instance. On the other hand, for proxies that do not support the installation of modules, similar functionality may be achieved by modifying the source code, although this may require deeper infrastructure control. In examples, this module may be configured to signal a network controller with proxied-connection information (or any other control-plane information) whenever a new proxied-connection is established.

In examples where proxies keep long lived tunnels (e.g., Istio's zTunnels), information associated with the tunnels may be signaled to the network controller as soon as they are created, without them actually starting to proxy any application traffic. In examples where long-lived tunnels are not kept, this signaling can be further optimized by only signaling the long-lived proxied-connections (e.g., those that live long enough so that they can benefit from optimizations driven by the off-band signaling to the network controller). In this case, a waiting (time) threshold may be introduced in the module and proxied-connections that live beyond that threshold may be notified to the network controller. In some instances, this may prevent forwarding proxied-connection state to the network controller for connections that are so short lived that the network controller would have no time to optimize before they are gone.

The techniques of this disclosure are also applicable in examples where no module in the proxy is used or capable of being used. That is, cases where the proxies do not support the use of modules, or when the use of modules has deeper implications (e.g., a module requires to recompile and redeploy the proxies). In such examples, a state of the proxies may be periodically polled by the network controller to determine the current state of the proxied connections at the proxy. Similarly, and even in cases when a module is present, if the proxy maintains long-lived tunnels these can be fetched at any time by the network controller and optimizations delivered immediately.

In examples, where the proxied-connections are not guaranteed to be long-lived, the network controller may poll the proxies at different intervals and correlate which proxied-connections are still present. In such an example, the connection that are present in, for instance, two or more polling events, are the flows that may be taken into account for optimization by the network controller. Fine tuning of the polling intervals may be done by network operators and/or the network controller based on the characteristics of the particular scenario.

The techniques disclosed herein may not modify, in any way, how a proxy handles traffic and how it generates and tears down proxied-connections. The techniques can be completely transparent from a data plane perspective and leverage purely control-plane mechanisms. Therefore, the techniques disclosed herein may be deployed on existing deployments with minimal to no disruption to current operation.

By way of example, and not limitation, a method according to the techniques disclosed herein may include receiving control plane information associated with a proxy that manages a proxied flow through a network. In examples, the control plane information may be received at a controller of the network. The network may, in some examples, be an interconnect network such as a software-defined network (SDN) architecture. In some examples, the control plane information may include connection-state information associated with the proxy. For instance, this connection state information may be indicative of one or more endpoint(s) (e.g., applications) associated with proxied flows managed by the proxy that flow through the network.

As noted above, the control plane information may be received by the controller in a number of different ways. For instance, in some examples, the control plane information may be received directly from the proxy and/or from a software component or module associated with the proxy. In one example, source code of the proxy may be modified to provide the control plane information to the controller. In another example, the proxy may be an Envoy proxy and the module may be an Envoy Filter, a Lua module, and/or a Web Assembly (WASM) module. In examples, the module may be configured to signal the network controller with proxied-connection information (or any other control-plane information) whenever a new proxied-connection is established.

In some examples, the control plane information may be received from a proxy controller associated with the proxy. Such a proxy controller may further be associated with one or more additional proxies as well, in some instances. In such examples, the proxy and/or the module may communicate the control plane information to the proxy controller. Additionally, or alternatively, the proxy controller may retrieve the control plane information from the proxy (e.g., by polling, inferring, sniffing connections, or the like).

In some examples, the control plane information may be received by the network controller based on the network controller directly polling the proxy. For instance, the network controller may communicate with the proxy periodically (e.g., every second, minute, cycle, etc.) to poll connection state of the proxy. In other words, rather than the proxy automatically sending the control plane information to the controller based on new proxied flows being created, or the like, the controller may poll the proxy periodically to determine the current state of the proxied connections at the proxy.

In some examples, the control plane information may be received by the controller at least partially responsive to the proxy establishing the proxied flow through the network. For instance, in some examples, the proxied connection may be a long-lived tunnel through the network and the control plane information may be received by the controller prior to the application traffic flowing through the long-lived tunnel. For instance, the proxy may keep long-lived tunnels (e.g., Istio zTunnels), and information associated with one of these long-lived tunnels may be signaled to the network controller as soon as the long-lived tunnel is created, without the proxy actually starting to proxy any application traffic.

In some examples, such as in cases where long-lived tunnels are not kept, the proxy (or the module) may optimize its own communications with the network controller by signaling only the long-lived proxied-connections (e.g., those that live long enough so that they can benefit from optimizations driven by the off-band signaling to the network controller). For example, the proxy/module may determine that the proxied flow has been established for longer than a threshold period of time. Based on this determination, the proxy/module may then make the decision to forward the control plane information/connection state information associated with this flow to the network controller. This may prevent forwarding proxied-connection state to the network controller for connections that are so short lived that the network controller would have no time to optimize before they are gone.

In some examples, the controller may determine, based on the control plane information, that application traffic is flowing across the proxied flow between a first application and a second application. That is, the controller may analyze the control plane information, which may be indicative of all of the proxied flows managed by the proxy that are traversing the network, and determine that one of those proxied flows corresponds with an application flow between a pair of applications. In some examples, this is because the proxy has knowledge (e.g., state) of which proxied connections correspond to which application connections, and the control plane information is indicative of this knowledge.

In some examples, the network controller may configure (or reconfigure) a network element (e.g., router, switch, node, gateway, firewall, etc.) of the network to optimize the application traffic flowing across the proxied flow. For instance, the network element may be disposed between the proxy and another proxy that are part of the application traffic flow between the first application and the second application. In some examples, the network controller may determine to configure the network element based at least in part on a policy associated with the first application, the second application, the network, or the like. In examples, such a policy may include to allocate additional bandwidth to the proxied flow, to decrease latency of the proxied flow, or the like.

In some examples, the method may further include determining, based on the control plane information, that the proxied flow has been established for longer than a threshold period of time. In such examples, the configuring/reconfiguring of the network element to optimize the application traffic flowing across the proxied flow may be further based on the proxied flow being established for longer than the threshold period of time.

In some examples, in addition to, or alternatively to, receiving control plane information from a single proxy, control plane information associated with multiple different proxies may be received. In such examples, the network controller may determine that the application traffic is flowing across the proxied flow between the first application and the second application based at least in part on the control plane information from all of the different proxies.

According to the technologies disclosed herein, several advantages in computer-related technology can be realized. For instance, by passing control plane information and/or connection state associated with a proxy to a network controller, the network controller is able to configure the network between proxies to optimize certain application traffic flows in a way that is transparent from a data plane perspective and does not affect proxy functionality. These advantages were not otherwise possible to be realized using other methods, and the techniques disclosed herein enables such advantages. These and other advantages will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 in which various aspects of the techniques disclosed herein may be performed. The exemplary proxies 102(1) and 102(2) shown in FIG. 1 each include a module 104(1) and 104(2) that is configured to forward control plane information 106 to a network controller 108 associated with a network 114. For instance, the example architecture 100 may represent a common proxy topology, which may be, for instance, the case of two East-West gateways on a service mesh architecture, interconnecting applications 110(1)-110(4) (hereinafter referred to collectively as "applications 110") across two different clusters. The proxies 102(1) and 102(2) (hereinafter referred to collectively as "proxies 102") may manage one or more proxied flow(s) 112 through the network 114.

The network 114, which, in some examples, may represent a software-defined network (SDN) or another type of interconnect network, may include one or more network element(s) 116 that are used to route and forward traffic through the network 114. In some examples, the control plane information 106 may include connection-state information associated with the proxies 102. For instance, this connection state information may be indicative of one or more endpoint(s) (e.g., applications 110) associated with the proxied flow(s) 112 managed by the proxies 102 that flow through the network 114. The network 114 may, in some examples, be an overlay network that is built on top of an underlay network. In some examples, the network element(s) 116 may be overlay network elements, underlay network elements, or a combination thereof.

In the exemplary implementation shown in FIG. 1, the control plane information 106 is received from the modules 104 (e.g., modules, software components, etc.) associated with the proxies 102. In some examples, the proxies 102 may be Envoy proxies and the modules 104 may be Envoy Filters, Lua modules, and/or Web Assembly (WASM) modules. In examples, the modules 104 may be configured to signal the network network controller 108 with the control plane information 106 (or any other connection state information) whenever a new proxied-flow 112 is established.

In some examples, the control plane information 106 may be received by the network controller 108 at least partially responsive to the proxies 102 establishing a new proxy flow through the network 114. For instance, in some examples, the proxy flow may be a long-lived tunnel through the network 114 and the control plane information 106 may be received by the network controller 108 prior to the application traffic flowing through the long-lived tunnel. For instance, the proxies 102 may keep long-lived tunnels (e.g., Istio zTunnels), and information associated with one of these long-lived tunnels may be signaled to the network network controller 108 as soon as the long-lived tunnel is created, without the proxies 102 actually starting to proxy any traffic between the applications 110 over that tunnel.

In some examples, such as in cases where long-lived tunnels are not kept, the modules 104 may optimize their own communications with the network controller 108 by signaling only the long-lived proxied-flow(s) 112 (e.g., those that live long enough so that they can benefit from optimizations driven by the off-band signaling to the network network controller 108). For example, the modules 104 may determine that a proxied flow has been established for longer than a threshold period of time. Based on this determination, the modules 104 may then make the decision to forward the control plane information 106/connection state information associated with this flow to the network controller 108. This may prevent forwarding proxied-flow state to the network controller 108 for flows that are so short lived that the network network controller 108 would have no time to optimize the flow before that flow is gone.

In some examples, the network controller 108 may determine, based on the control plane information 106, that application traffic is flowing across a specific one of the proxied flow(s) 112 between a first application 110(1) and a second application 110(2). That is, the network controller 108 may analyze the control plane information 106, which may be indicative of all of the proxied flow(s) 112 managed by the proxies 102 that are traversing the network 114, and determine that one of those proxied flows corresponds with an application flow between a pair of applications 110(1) and 110(2), 110(3) and 110(4), etc. In some examples, this is because the proxies 102 have knowledge (e.g., state) of which proxied flow(s) 112 correspond to which application connections, and the control plane information 106 may be indicative of this knowledge.

In some examples, the network network controller 108 may make one or more optimization(s) 118 by configuring (or reconfiguring) one or more of the network element(s) 116 (e.g., routers, switches, nodes, gateways, firewalls, etc.) of the network 114 to optimize the application traffic flowing across the proxied flow(s) 112. For instance, the network 114 and the network element(s) 116 may be disposed between a first proxy 102(1) and a second proxy 102(2) that are part of the application traffic flow between the first application 110(1) and the second application 110(2). In some examples, the network network controller 108 may determine to configure the network element(s) 116 based at least in part on a policy associated with the first application 110(1), the second application 110(2), the network 114, the cluster(s) or resource(s) hosting the applications 110 (e.g., Kubernetes), or the like.

Figure 2:
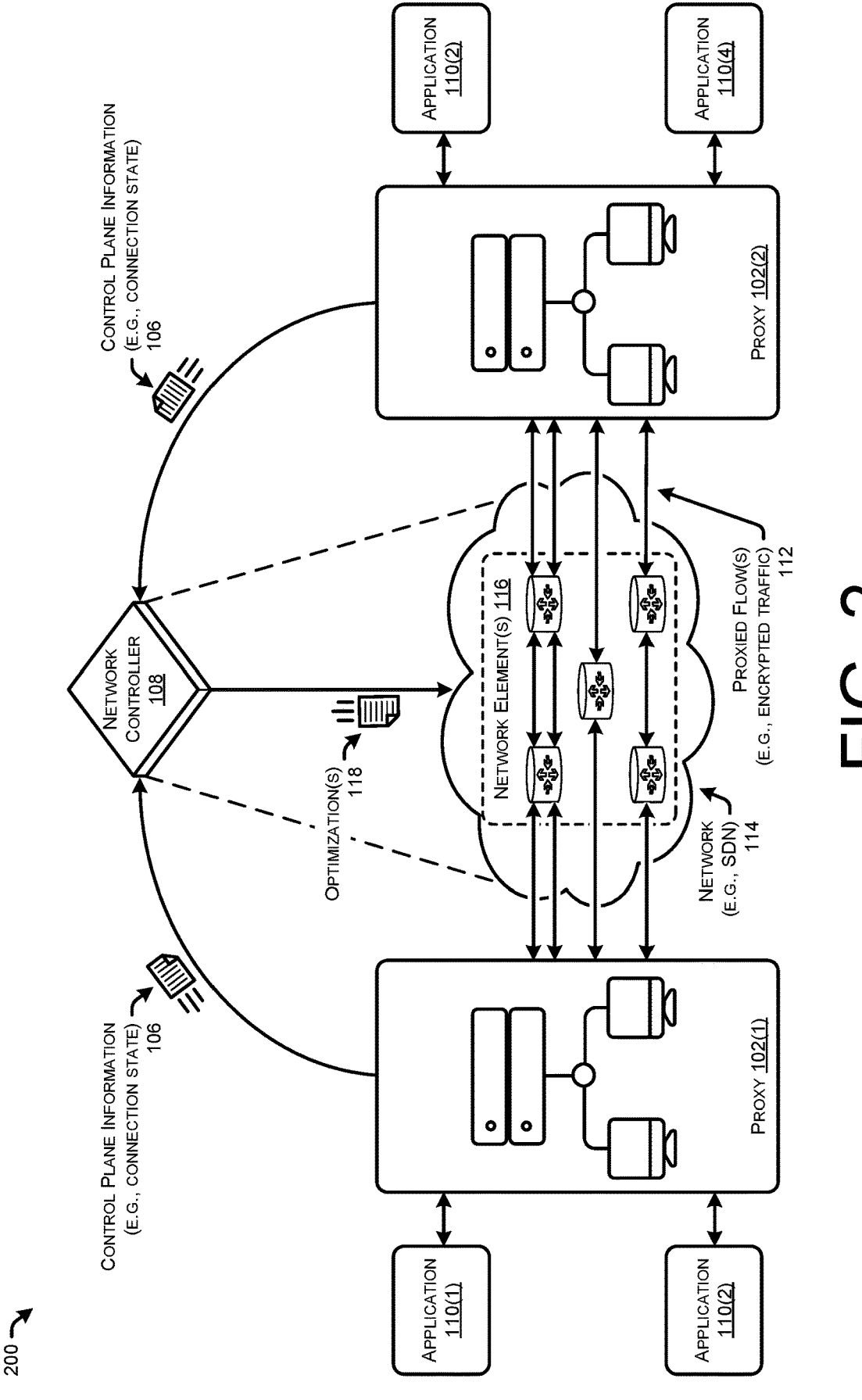
FIG. 2 illustrates an exemplary implementation in which the proxies of an example architecture are configured to forward control plane information directly to the controller.

FIG. 2 illustrates an exemplary implementation in which the proxies 102 of an example architecture 200 are configured to forward the control plane information 106 directly to the network controller 108. For instance, source code of the proxies 102 may be modified to provide the control plane information 106 to the network controller 108. In some instances, as discussed above, proxies may not support the use of modules to forward the control plane information 106, but the source code of the proxies 102 may be altered to provide the functionality of sending the control plane information 106 to the network controller 108 for carrying out the techniques described herein.

Figure 3:
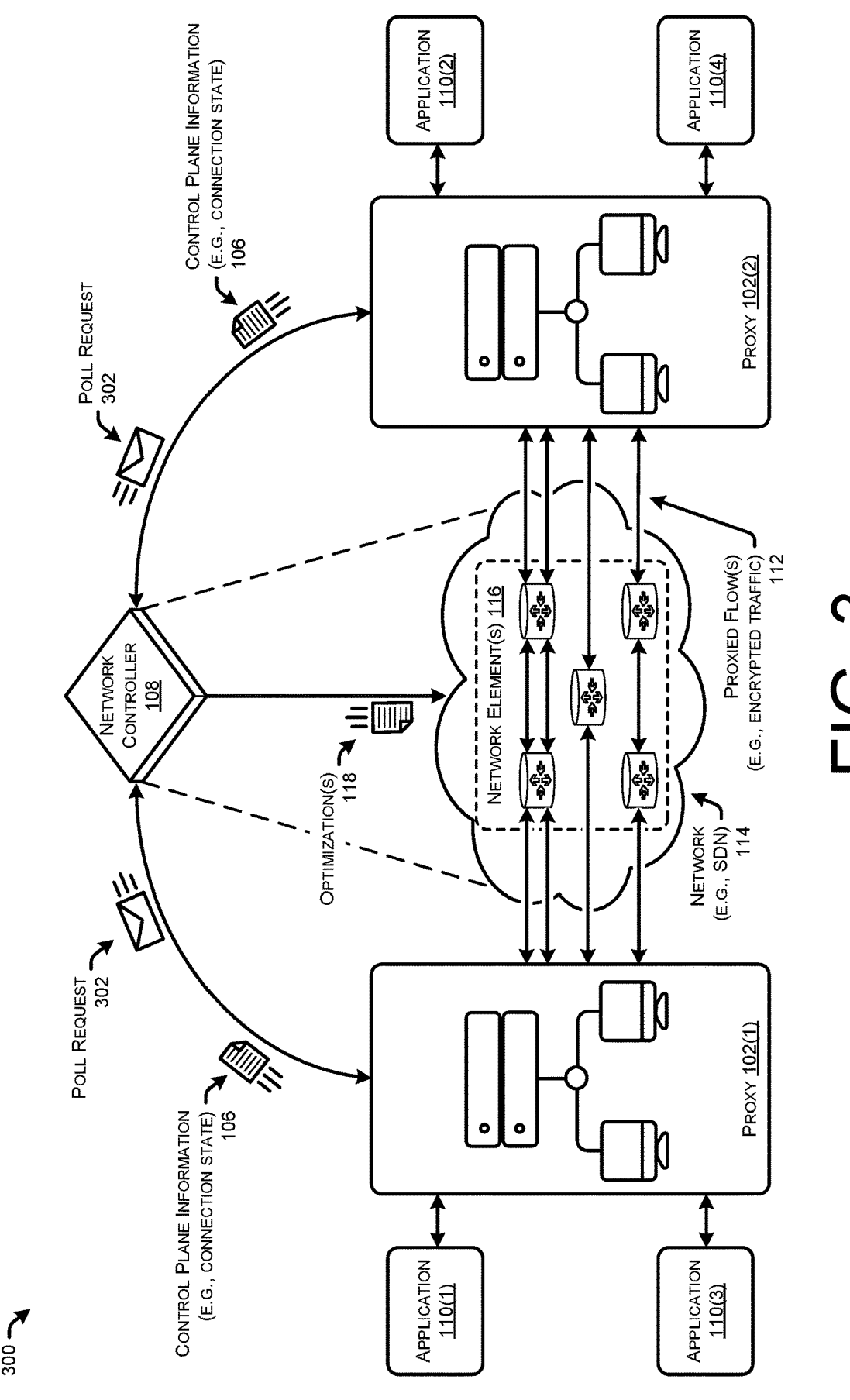
FIG. 3 illustrates another exemplary implementation in which the controller of an example architecture is configured to poll the proxies for the control plane information.

FIG. 3 illustrates another exemplary implementation in which the network controller 108 of an example architecture 300 is configured to poll the proxies 102 for the control plane information 106. For instance, the network controller 108 may send poll requests 302 to the proxies 102, and the proxies may, in response, provide the control plane information 106. In some examples, the network controller 108 may send the poll requests 302 to the proxies 102 periodically (e.g., every cycle, second, minute, etc.) to poll the connection state of the proxies 102. In other words, rather than the proxies 102 automatically sending the control plane information 106 to the network controller 108 based on new proxied flow(s) 112 being created, or the like, the network controller 108 may poll the proxies 102 periodically to determine the current state of the proxied flow(s) 112 at the proxies 102. Additionally, or alternatively, in some examples the network controller 108 may subscribe to updates on the proxy state (e.g., if the proxy has some form of API that supports a PubSub model or the like).

Figure 4:
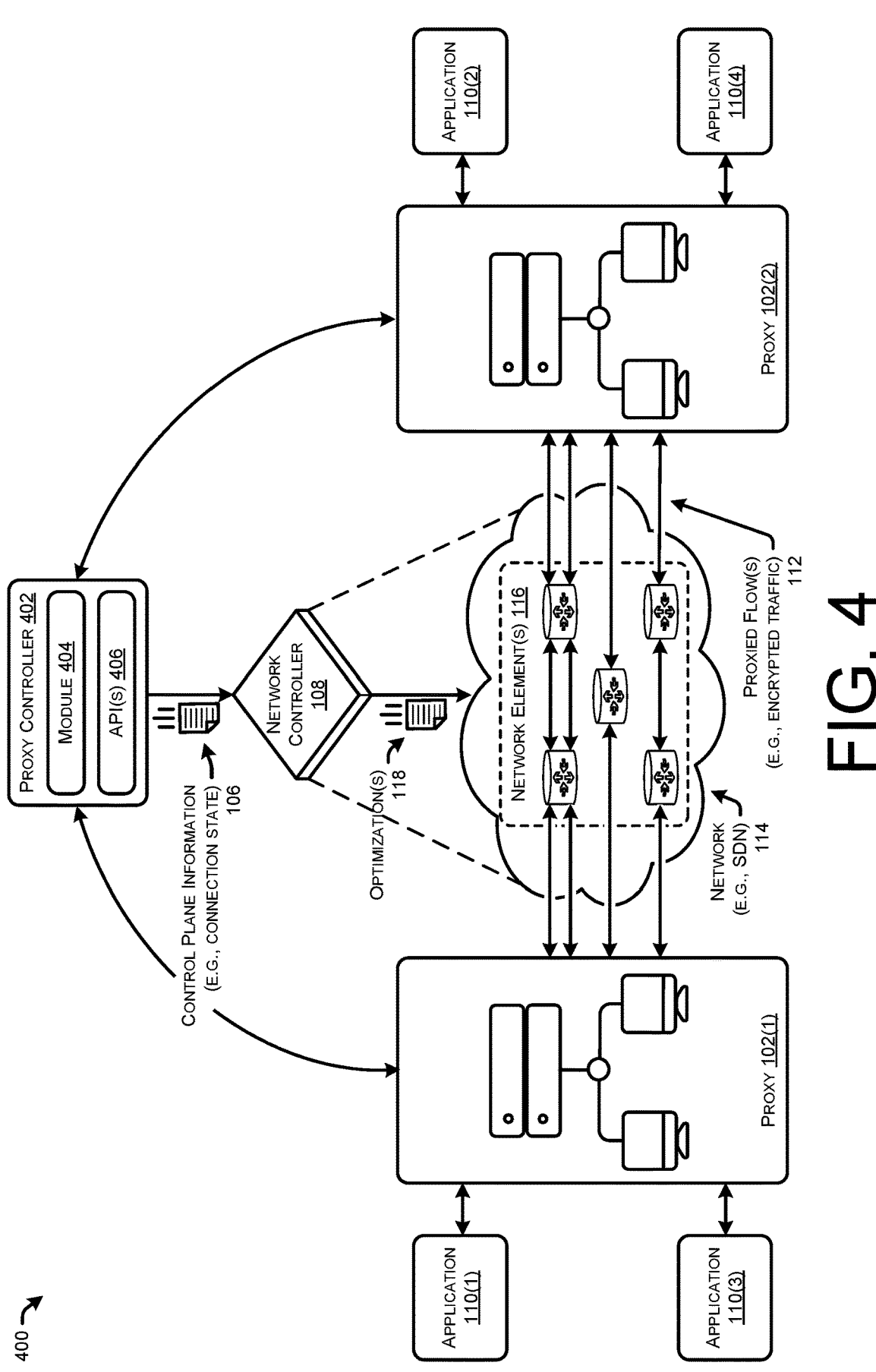
FIG. 4 illustrates yet another exemplary implementation in which a proxy controller of an example architecture is configured to provide the control plane information to the controller.

FIG. 4 illustrates yet another exemplary implementation in which a proxy controller 402 of an example architecture 400 is configured to provide the control plane information 106 to the network controller 108. For instance, in many proxy deployments there is a proxy controller 402 that takes care of orchestrating/managing the proxies 102. In such cases, as is illustration in FIG. 4, it may be more optimal for the network controller 108 to interact with proxy controller 402 than directly with the proxies 102.

In these cases, the network controller 108 may interact with the proxy controller 402 in a number of ways. For example, the proxy controller 402 may include a module 404 that sends the control plane information 106 (e.g., connection state) to the network controller 108. Additionally, or alternatively, the network controller 108 may utilize one or more API(s) 406 of the proxy controller 402 to extract the control plane information 106. In many cases, such an API-based solution may be very feasible and may leave the proxy controller 402 unmodified. In such examples, the communication between the network controller 108 and the proxy controller 402 and/or API(s) 406 may be poll-based. However, if the API(s) 406 of the proxy controller 402 support more advanced communication patterns (e.g. Pub-Sub), then those communication patterns may be used.

Additionally, or alternatively, instead of the network controller 108 interacting with the proxy controller 402 or with the proxies 102, the network controller 108 may sniff and/or intercept communications between the proxies 102 and the proxy controller 402 to gather the control plan information 106.

FIGS. 5 and 6 are flow diagrams illustrating example methods 500 and 600 associated with the techniques described herein. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

With respect to FIG. 5, the method 500 begins at operation 502, which includes receiving control plane information associated with a proxy that manages a proxied flow through a network. For instance, the network controller 108 may receive the control plane information 106 associated with the proxy 102(1) that manages one of the proxied flow(s) 112 through the network 114.

At operation 504, the method 500 includes determining, based on the control plane information, that application traffic is flowing across the proxied flow between a first application and a second application. For instance, the network controller 108 may determine, based on the control plane information 106, that application traffic is flowing across the proxied flow: 112 between the first application 110(1) and the second application 110(2).

At operation 506, the method 500 includes, based at least in part on a policy associated with at least one of the first application or the second application, configuring a network element of the network to optimize the application traffic flowing across the proxied flow: For instance, the network controller 108 may configure one or more of the network element(s) 116 of the network 114 to optimize the application traffic flowing across the proxied flow: 112.

With respect to FIG. 6, the method 600 begins at operation 602, which includes determining a connection state associated with at least one of a proxied flow or a tunnel through a network. For instance, the network controller 108 may determine the connection state associated with one or more of the proxied flow(s) 112 through the network 114, or a tunnel through the network 114. In some instances, the controller may determine the connection state based on receiving control plane information associated with the proxy. In some cases, the controller may receive the control plane information automatically (e.g., from the proxy, from a module of the proxy, from a proxy controller, etc.) or the controller may poll the proxy or proxy controller to obtain the control plane information and/or determine the connection state.

At operation 604, the method 600 includes determining that at least one of the proxied flow or the tunnel is a long-lived flow or a long-lived tunnel through the network in which application traffic is flowing between a first application and a second application. For instance, the network controller 108 may determine, based on the connections state, that the proxied flow 112 is a long-lived flow (e.g., or a flow that is traversing a long-lived tunnel) through the network 114 in which the application traffic is flowing between the first application 110(1) and the second application 110(2). In some examples, the controller may determine that the flow is a long-lived flow based on the flow being present over the course of one or more polling events, in some instances. That is, the controller may receive an indication that the flow has been active for more than a threshold period of time and, therefore, determine that the flow is long-lived.

At operation 606, the method 600 includes configuring a network element of the network to optimize the application traffic flowing across the proxied flow or the tunnel. For instance, the network controller 108 may, based at least in part on the proxied flow or tunnel being the long-lived flow/tunnel, configure one or more of the network element(s) 116 of the network 114 to optimize the application traffic flowing across the proxied flow 112 or tunel. In some examples, configuring the network element(s) may include configuring underlay network elements, overlay network elements, or a combination thereof.

Figure 7:
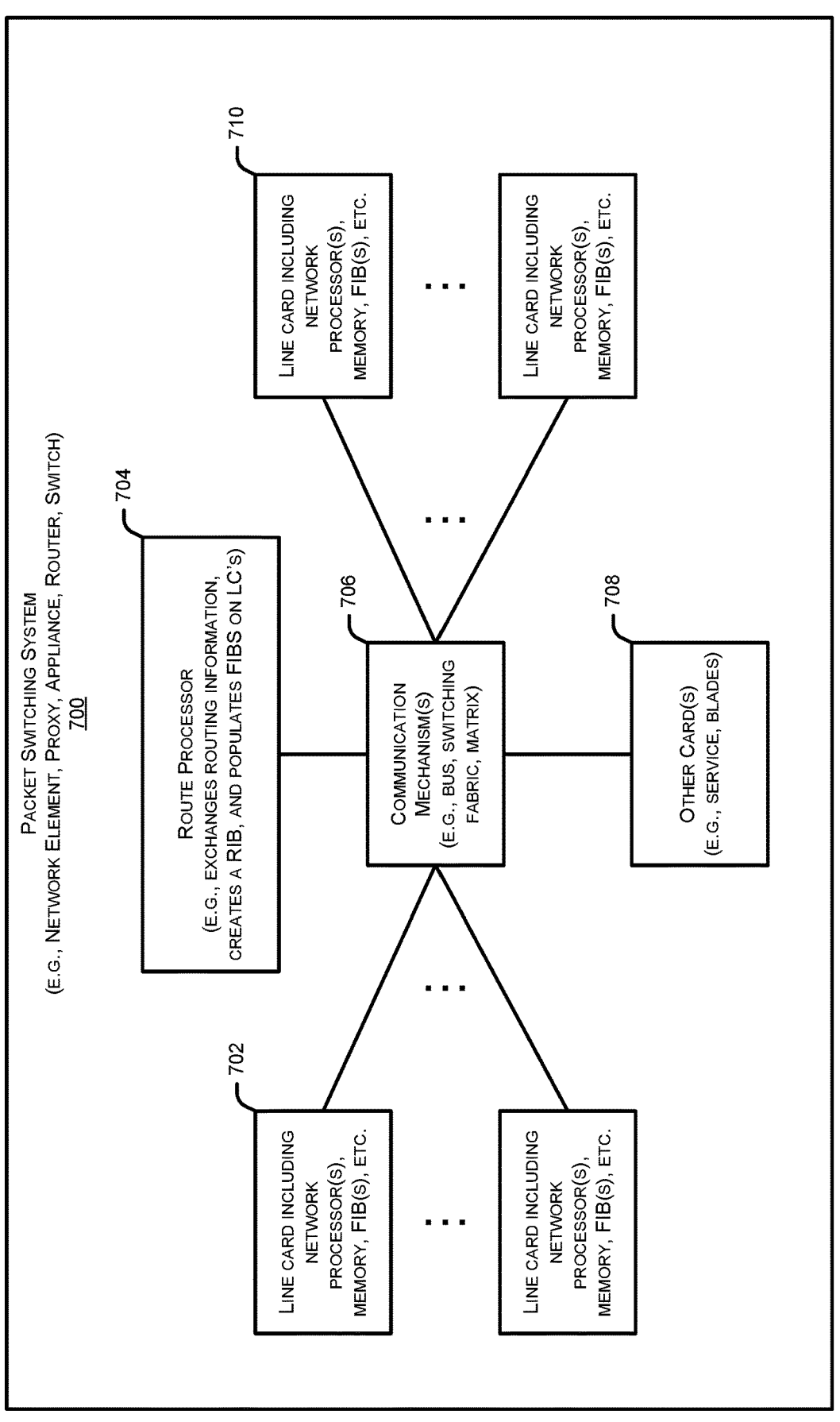
FIG. 7 is a block diagram illustrating an example packet switching system that can be utilized to implement various aspects of the technologies disclosed herein.

FIG. 7 illustrates a block diagram illustrating an example packet switching device 700 (or packet switching system) that can be utilized to implement various aspects of the technologies disclosed herein. In some examples, packet switching device(s) 700 may be employed in various networks and architectures, such as, for example, the network 114 and the architectures 100, 200, 300, and 400 as described with respect to FIGS. 1-4.

In some examples, a packet switching device 700 may comprise multiple line card(s) 702, 710, each with one or more network interfaces for sending and receiving packets over communications links (e.g., possibly part of a link aggregation group). The packet switching device 700 may also have a control plane with one or more route processor 704 elements for managing the control plane and/or control plane processing of packets associated with forwarding of packets in a network, including, but not limited to, exchanging routing information, creating routing information base(s) (RIBs), and/or populating forward information base(s) (FIBs) on LCs. The packet switching device 700 may also include other cards 708 (e.g., service cards, blades) which include processing elements that are used to process (e.g., forward/send, drop, manipulate, change, modify, receive, create, duplicate, apply a service) packets associated with forwarding of packets in a network. The packet switching device 700 may comprise hardware-based communication mechanism 706 (e.g., bus, switching fabric, and/or matrix, etc.) for allowing its different entities to communicate. Line card(s) 702, 710 may typically perform the actions of being both an ingress and/or an egress line card 702, 710, in regard to multiple other particular packets and/or packet streams being received by, or sent from, packet switching device 700.

Figure 8:
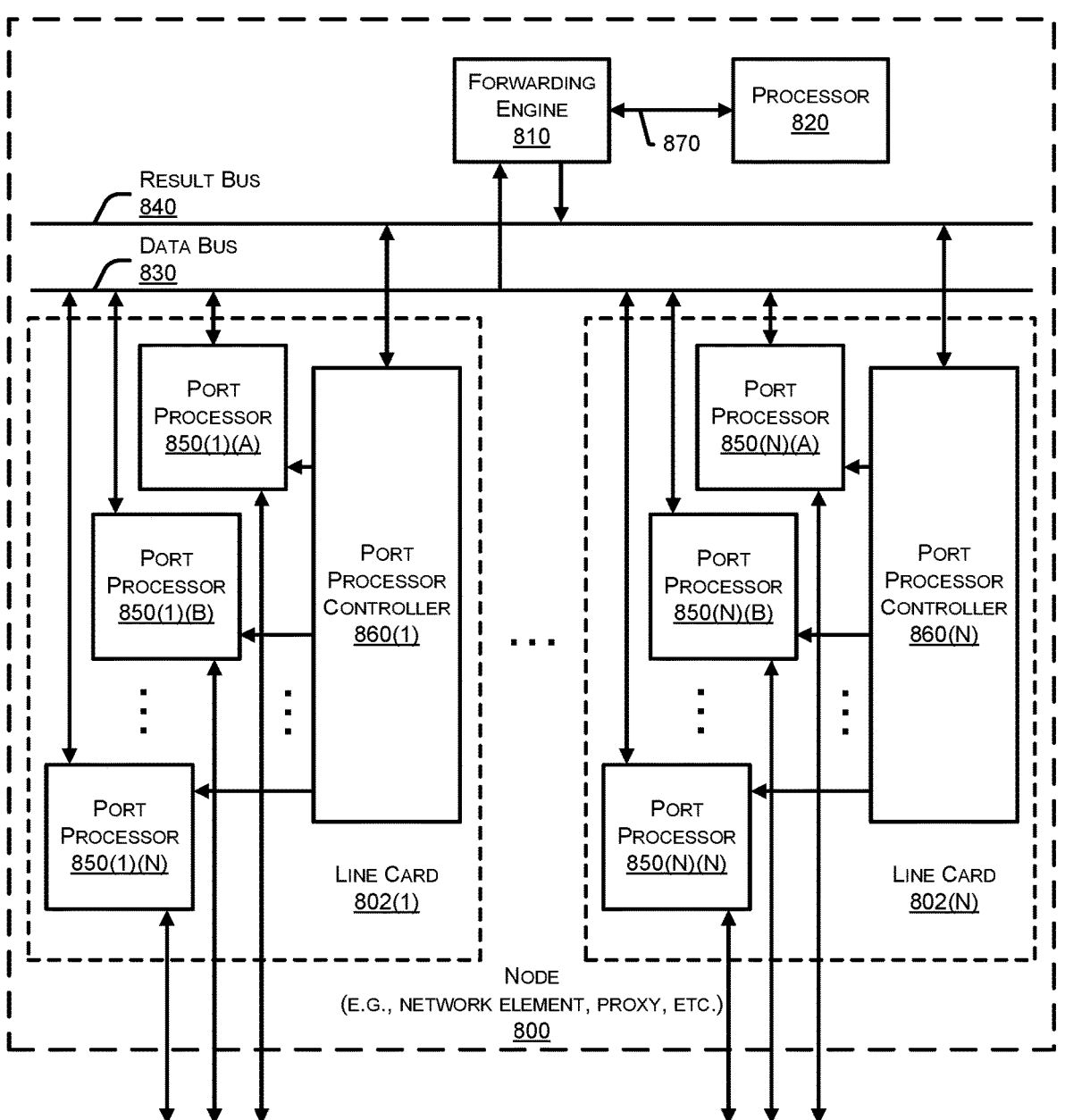
FIG. 8 is a block diagram illustrating certain components of an example node that can be utilized to implement various aspects of the technologies disclosed herein.

FIG. 8 illustrates a block diagram illustrating certain components of an example node 800 that can be utilized to implement various aspects of the technologies disclosed herein. In some examples, node(s) 800 may be employed in various architectures and networks, such as, for example, the network 114 and the architectures 100, 200, 300, and 400 as described with respect to FIGS. 1-4.

In some examples, node 800 may include any number of line cards 802 (e.g., line cards 802(1)-(N), where N may be any integer greater than 1) that are communicatively coupled to a forwarding engine 810 (also referred to as a packet forwarder) and/or a processor 820 via a data bus 830 and/or a result bus 840. Line cards 802(1)-(N) may include any number of port processors 850(1)(A)-(N)(N) which are controlled by port processor controllers 860(1)-(N), where N may be any integer greater than 1. Additionally, or alternatively, forwarding engine 810 and/or processor 820 are not only coupled to one another via the data bus 830 and the result bus 840, but may also communicatively coupled to one another by a communications link 870.

The processors (e.g., the port processor(s) 850 and/or the port processor controller(s) 860) of each line card 802 may be mounted on a single printed circuit board. When a packet or packet and header are received, the packet or packet and header may be identified and analyzed by node 800 (also referred to herein as a router) in the following manner. Upon receipt, a packet (or some or all of its control information) or packet and header may be sent from one of port processor (s) 850(1)(A)-(N)(N) at which the packet or packet and header was received and to one or more of those devices coupled to the data bus 830 (e.g., others of the port processor (s) 850(1)(A)-(N)(N), the forwarding engine 810 and/or the processor 820). Handling of the packet or packet and header may be determined, for example, by the forwarding engine 810. For example, the forwarding engine 810 may determine that the packet or packet and header should be forwarded to one or more of port processors 850(1)(A)-(N)(N). This may be accomplished by indicating to corresponding one(s) of port processor controllers 860(1)-(N) that the copy of the packet or packet and header held in the given one(s) of port processor(s) 850(1)(A)-(N)(N) should be forwarded to the appropriate one of port processor(s) 850(1)(A)-(N)(N). Additionally, or alternatively, once a packet or packet and header has been identified for processing, the forwarding engine 810, the processor 820, and/or the like may be used to process the packet or packet and header in some manner and/or maty add packet security information in order to secure the packet. On a node 800 sourcing such a packet or packet and header, this processing may include, for example, encryption of some or all of the packet's and/or header's information, the addition of a digital signature, and/or some other information and/or processing capable of securing the packet or packet and header. On a node 800 receiving such a processed packet or packet and header, the corresponding process may be performed to recover or validate the packet's and/or header's information that has been secured.

Figure 9:
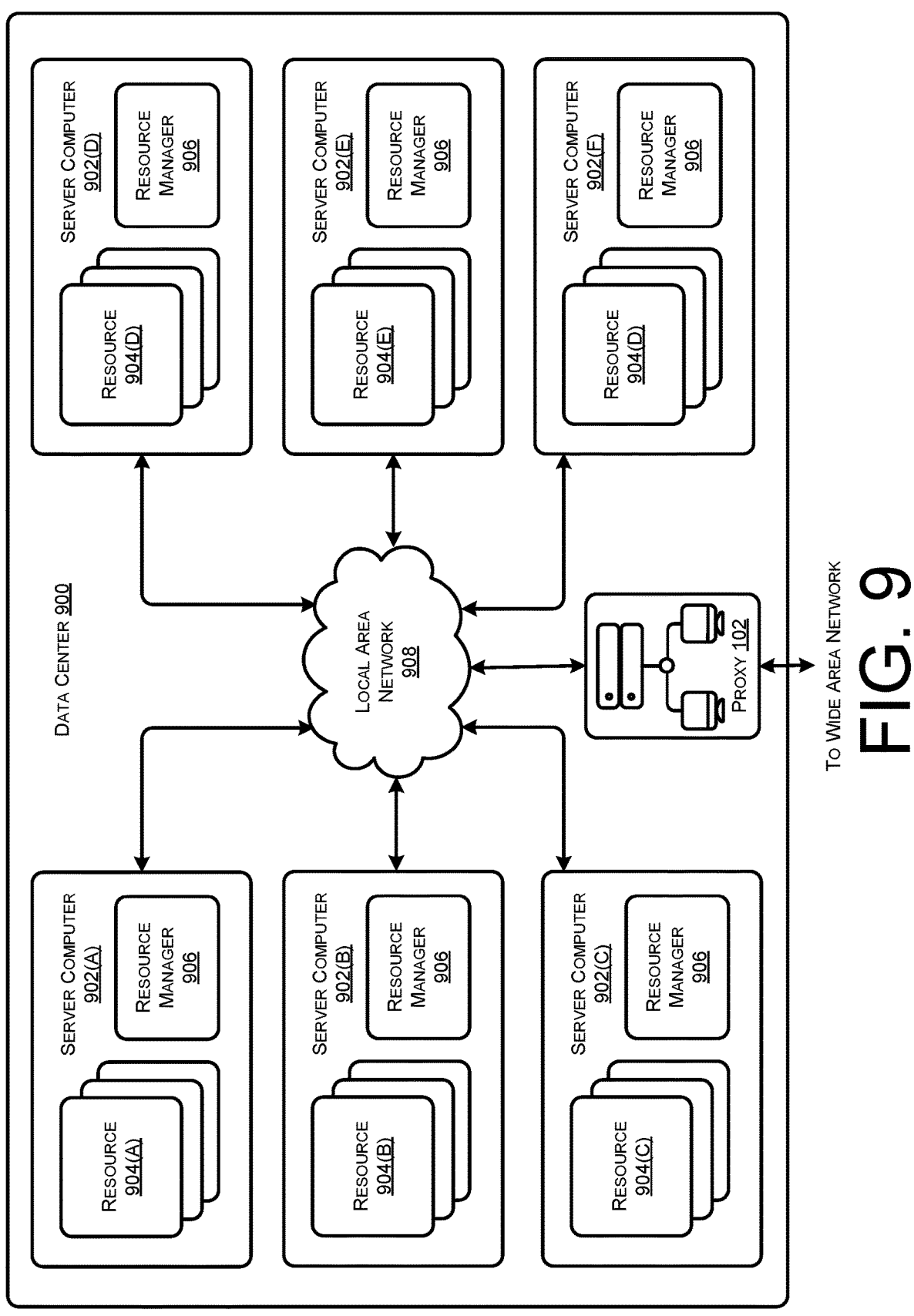
FIG. 9 is a computing system diagram illustrating an example configuration of a data center that can be utilized to implement aspects of the technologies disclosed herein.

FIG. 9 is a computing system diagram illustrating an example configuration of a data center 900 that can be utilized to implement aspects of the technologies disclosed herein. The example data center 900 shown in FIG. 9 includes several server computers 902A-902F (which might be referred to herein singularly as "a server computer 902" or in the plural as "the server computers 902") for providing computing resources. In some examples, the resources and/or server computers 902 may include, or correspond to, the any type of networked device described herein. Although described as servers, the server computers 902 may comprise any type of networked device, such as servers, switches, routers, hubs, bridges, gateways, modems, repeaters, access points, proxies, etc.

The server computers 902 can be standard tower, rackmount, or blade server computers configured appropriately for providing computing resources. In some examples, the server computers 902 may provide computing resources 904 including data processing resources such as VM instances or hardware computing systems, database clusters, computing clusters, storage clusters, data storage resources, database resources, networking resources, VPNs, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 900 can also be configured to provide network services and other types of services. In some examples, the resources 904 may correspond with the applications 110.

In the example data center 900 shown in FIG. 9, an appropriate LAN 908 (local area network) is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized. In some examples, a proxy 102 as described herein may be disposed in the data center 900.

In some instances, the data center 900 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like tenant containers and VM instances, data storage resources, networking resources, data communication resources, network services, VPN instances, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 10.

Figure 10:
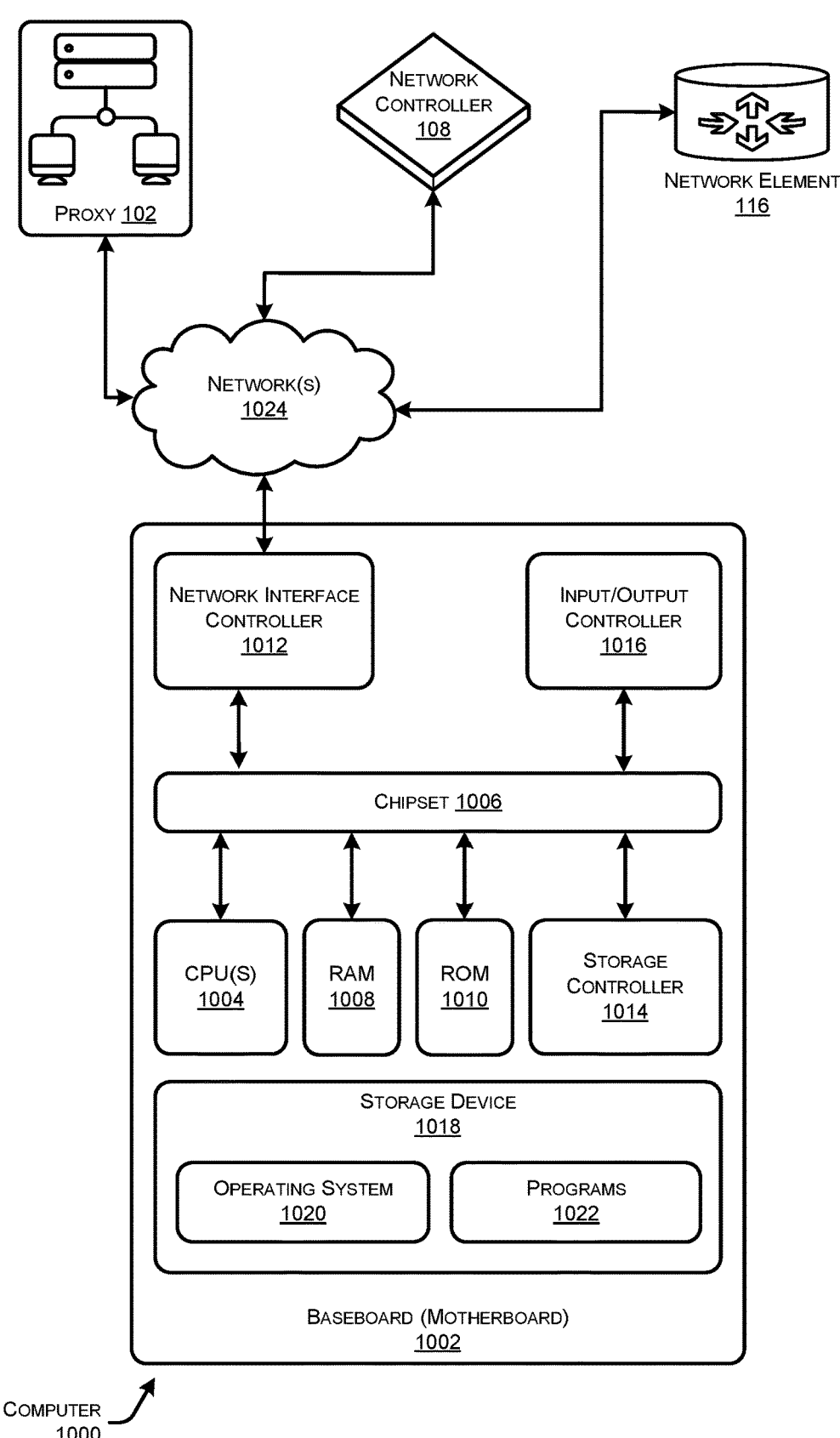
FIG. 10 is a computer architecture diagram showing an illustrative computer hardware architecture for implementing a computing device that can be utilized to implement aspects of the various technologies presented herein.

FIG. 10 is a computer architecture diagram showing an illustrative computer hardware architecture for implementing a computing device that can be utilized to implement aspects of the various technologies presented herein. The computer architecture shown in FIG. 10 illustrates a conventional server computer, network element 116, network controller 108, proxy 102, router, workstation, desktop computer, laptop, tablet, network appliance, e-reader, smartphone, load balancer, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network. The chipset 1006 can include functionality for providing network connectivity through a NIC 1012, such as a gigabit Ethernet adapter. The NIC 1012 is capable of connecting the computer 1000 to other computing devices over the network 1024, such as the proxy 102, the network controller 108, and/or the network element 116. It should be appreciated that multiple NICs 1012 can be present in the computer 1000, connecting the computer to other types of networks and remote computer systems. In some examples, the NIC 1012 may be configured to perform at least some of the techniques described herein.

The computer 1000 can be connected to a storage device 1018 that provides non-volatile storage for the computer. The storage device 1018 can store an operating system 1020, programs 1022, and data, which have been described in greater detail herein. The storage device 1018 can be connected to the computer 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the architectures 100-400 and or any components included therein, may be supported by one or more devices similar to computer 1000. Stated otherwise, some or all of the operations performed by the architectures 100-400, and or any components included therein, may be performed by one or more computer devices 1000 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS®: SERVER operating system from MICROSOFT Corporation of Redmond, Washington. According to further embodiments, the operating system can comprise the UNIX operating system or one of its variants. It should be appreciated that other operating systems can also be utilized. The storage device 1018 can store other system or application programs and data utilized by the computer 1000.

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes and functionality described above with regard to FIGS. 1-8, and herein. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

The computer 1000 may include one or more hardware processors (processors) configured to execute one or more stored instructions. The processor(s) may comprise one or more cores. Further, the computer 1000 may include one or more network interfaces configured to provide communications between the computer 1000 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1022 may comprise any type of programs or processes to perform the techniques described in this disclosure for signaling, to a network controller, a connection state of a proxy for use by the network controller to correlate proxied-connections with application pairs for traffic optimization.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partially by a controller of a network the method comprising:

receiving control plane information associated with a first proxy that manages a proxied flow through the network;

determining, based on the control plane information, that application traffic is flowing across the proxied flow between a first application and a second application;

determining, based at least in part on the control plane information, that the proxied flow has been established for longer than a threshold period of time; and based at least in part on determining that the proxied flow has been established for longer than the threshold period of time, configuring a network element of the network to optimize the application traffic flowing across the proxied flow according to a policy associated with at least one of the first application or the second application, wherein the network element is disposed between the first proxy and a second proxy associated with the proxied flow between the first application and the second application.

2. The method of claim 1, wherein the control plane information is connection-state information associated with the first proxy, the connection-state information indicative of respective endpoints associated with proxied flows managed by the first proxy that flow through the network.

3. The method of claim 1, wherein the control plane information is received, by the controller, from at least one of the first proxy or from a software component or module associated with the first proxy.

4. The method of claim 1, wherein the control plane information is received, by the controller, at least partially responsive to the first proxy establishing the proxied flow through the network.

5. The method of claim 1, wherein the proxied flow is a long-lived tunnel through the network.

6. The method of claim 1, wherein the network is a software-defined network (SDN) and the controller is an SDN controller.

7. The method of claim 1, wherein the control plane information is received from a proxy controller associated with the first proxy and the second proxy.

8. The method of claim 1, wherein the control plane information is first control plane information, and the method further comprising receiving second control plane information associated with the second proxy, wherein determining that the application traffic is flowing across the proxied flow between the first application and the second application is further based at least in part on the second control plane information.

9. A system associated with a controller of a network, the system comprising:

one or more processors; and one or more non-transitory computer-readable media storing instructions that, when executed, cause the one or more processors to perform operations comprising:

receiving control plane information associated with a first proxy that manages a proxied flow through the network;

determining, based on the control plane information, that application traffic is flowing across the proxied flow between a first application and a second application;

determining, based at least in part on the control plane information, that the proxied flow has been established for longer than a threshold period of time; and based at least in part on determining that the proxied flow has been established for longer than the threshold period of time, configuring a network element of the network to optimize the application traffic flowing across the proxied flow according to a policy associated with at least one of the first application or the second application, wherein the network element is disposed between the first proxy and a second proxy associated with the proxied flow between the first application and the second application.

10. The system of claim 9, wherein the control plane information is connection-state information associated with the first proxy, the connection-state information indicative of respective endpoints associated with proxied flows managed by the first proxy that flow through the network.

11. The system of claim 9, wherein the control plane information is received, by the controller, from at least one of the first proxy or from a software component or module associated with the first proxy.

12. The system of claim 9, wherein the control plane information is received, by the controller, at least partially responsive to the first proxy establishing the proxied flow through the network.

13. The system of claim 9, wherein the proxied flow is a long-lived tunnel through the network.

14. The system of claim 9, wherein the network is a software-defined network (SDN) and the controller is an SDN controller.

15. The system of claim 9, wherein the control plane information is received from a proxy controller associated with the first proxy and the second proxy.

16. The system of claim 9, wherein the control plane information is first control plane information, and the operations further comprising receiving second control plane information associated with the second proxy, wherein determining that the application traffic is flowing across the proxied flow between the first application and the second application is further based at least in part on the second control plane information.

17. One or more non-transitory computer-readable media storing instructions that, when executed, cause one or more processors to perform operations comprising:

determining a connection state associated with a proxied flow through a network;

determining, based on the connection state, that the proxied flow is a long-lived flow through the network in which application traffic is flowing between a first application and a second application, wherein the long-lived flow has been established for longer than a threshold period of time; and based at least in part on the proxied flow being the long-lived flow, configuring a network element of the network to optimize the application traffic flowing across the proxied flow, wherein the network element is disposed between a first proxy and second proxy that manage the proxied flow between the first application and the second application.

18. The one or more non-transitory computer-readable media of claim 17, the operations further comprising:

obtaining, at a first instance in time, first control plane information from at least one of the first proxy or the second proxy associated with the proxied flow; and obtaining, at a second instance of time, second control plane information from at least one of the first proxy or the second proxy, wherein determining the connection state is based at least in part on the first control plane information and the second control plane information.

19. The one or more non-transitory computer-readable media of claim 17, wherein the connection state is associated with the first proxy that manages the proxied flow and is indicative of respective endpoints associated with proxied flows, managed by the first proxy, that flow through the network.

20. The one or more non-transitory computer-readable media of claim 19, wherein the connection state is determined, by a controller of the network, based at least in part on data received from at least one of the first proxy or from a software component associated with the first proxy.

* * * * *